(12) United States Patent
Kim et al.

(10) Patent No.: US 11,017,508 B2
(45) Date of Patent: May 25, 2021

(54) IMAGE MATCHING METHOD AND APPARATUS

(71) Applicant: LG INNOTEK CO., LTD., Seoul (KR)

(72) Inventors: Dong Gyun Kim, Seoul (KR); Sung Hyun Lim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 53 days.

(21) Appl. No.: 16/341,336

(22) PCT Filed: Oct. 12, 2017

(86) PCT No.: PCT/KR2017/011240
§ 371 (c)(1),
(2) Date: Apr. 11, 2019

(87) PCT Pub. No.: WO2018/070799
PCT Pub. Date: Apr. 19, 2018

(65) Prior Publication Data
US 2020/0051222 A1 Feb. 13, 2020

(30) Foreign Application Priority Data

Oct. 12, 2016 (KR) .......................... 10-2016-0132439
Dec. 6, 2016 (KR) .......................... 10-2016-0165384

(51) Int. Cl.
*G06K 9/40* (2006.01)
*G06T 5/00* (2006.01)
*G06T 5/50* (2006.01)

(52) U.S. Cl.
CPC ................ *G06T 5/008* (2013.01); *G06T 5/50* (2013.01); *G06T 2207/30252* (2013.01)

(58) Field of Classification Search
CPC .. G06T 5/008; G06T 5/50; G06T 5/00; G06T 2207/30252; G06T 3/4038; H04N 5/23238
See application file for complete search history.

(56) References Cited

U.S. PATENT DOCUMENTS 5,982,951 A * 11/1999 Katayama ............ H04N 1/3876
348/584
2002/0196340 A1 12/2002 Kato et al.
(Continued)

FOREIGN PATENT DOCUMENTS

CN 105981367 A 9/2016
DE 10-2006-036933 A1 2/2008
(Continued)

*Primary Examiner* — Amara Abdi
(74) *Attorney, Agent, or Firm* — Birch, Stewart, Kolasch & Birch, LLP

(57) ABSTRACT

An image matching method and apparatus are disclosed. The method according to the present embodiment comprises: a step of acquiring source image; a step of acquiring a transformation image, by converting the display mode of the source images into a top view and adjusting the brightness thereof through auto exposure (AE); a step of acquiring image information; and a step of generating a target image comprising a first area and a second area in an overlap area in which pixels of a corrected transformation image are disposed on the basis of the image information, wherein the correction comprises gradation correction of the pixels of an image disposed in the first area and pixels of an image in the second area.

19 Claims, 19 Drawing Sheets

(56) References Cited

U.S. PATENT DOCUMENTS

| | | | | |
|---|---|---|---|---|
| 2007/0181684 A1* | 8/2007 | Takano | ................ | G06K 7/1443 |
| | | | | 235/454 |
| 2013/0208140 A1* | 8/2013 | Quast | ................ | H04N 5/23203 |
| | | | | 348/229.1 |
| 2013/0223758 A1 | 8/2013 | Hou et al. | | |
| 2013/0287316 A1* | 10/2013 | Kaneko | ................ | G06T 3/4038 |
| | | | | 382/284 |
| 2014/0160275 A1 | 6/2014 | Sakakibara et al. | | |
| 2015/0360612 A1 | 12/2015 | Lee | | |

FOREIGN PATENT DOCUMENTS

| | | | | |
|---|---|---|---|---|
| EP | 0 650 299 A1 | 4/1995 | | |
| EP | 1377026 A2 | 1/2004 | | |
| EP | 1 801 735 A1 | 6/2008 | | |
| EP | 2182485 A2 | 5/2010 | | |
| EP | 2629506 A1 | 8/2013 | | |
| JP | 3706645 B2 | 10/2005 | | |
| KR | 10-2011-0005482 A | 1/2011 | | |
| KR | 10-1012585 B1 | 2/2011 | | |
| WO | WO 2010/101434 | * | 9/2010 | ........... G06T 3/4038 |
| WO | WO 2012/024830 A1 | 3/2012 | | |
| WO | WO 2015/123173 A1 | 8/2015 | | |

\* cited by examiner

IMAGE MATCHING METHOD AND APPARATUS

CROSS REFERENCE TO RELATED APPLICATIONS

This application is the National Phase of PCT/KR2017/011240 filed on Oct. 12, 2017, which claims priority under 35 U.S.C. § 119(a) to Patent Application Nos. 10-2016-0132439 and 10-2016-0165384 filed in Republic of Korea on Oct. 12, 2016 and Dec. 6, 2016, all of which are hereby expressly incorporated by reference into the present application.

TECHNICAL FIELD

Embodiments relate to an image processing method and apparatus, and more particularly, to a method and apparatus for generating an around view image that is matched using a source image for around view monitoring (AVM).

BACKGROUND ART

Due to an increase in vehicles and traffic volumes, a rapid increase in traffic accidents has become a social issue, and thus, research has been actively conducted into a driver assistance system for preventing accidents. The driver assistance system assists a driver in driving or parking a vehicle for safety driving of the driver.

The driver assistance system necessarily includes an apparatus for providing image information to recognize an external situation of a vehicle when a driver sits on a driver seat. In addition, the apparatus for providing image information includes a camera.

A plurality of cameras directed in various directions may be installed outside the vehicle in order to provide the image information to the driver. When images acquired by the respective cameras are provided to the driver, the acquired images may be differently transformed according to various view modes and may be provided to the driver.

However, a problem has been pointed out in that a step difference is generated due to a brightness difference between the provided images or a ghost phenomenon occurs during an image synthesis procedure in an alpha blending method corresponding to the prior art. This problem has been particularly pointed output in an image for an around view monitoring (AVM) system.

An around view monitoring (AVM) system has been actively researched recently to provide vehicle surroundings to a driver in the form of an image with a plurality of cameras installed in the system. Various automobile companies from Germany and Japan as well as the national companies already develop and release AVM systems in the form of a product. Recently, systems including a plurality of cameras installed therein to provide a bird's eye view as an elevated view of an object from above to a driver have been most mainly used An AVM system may generate an image indicating an object, e.g., vehicle surroundings at a viewing angle of 360 degrees using an image acquired by a limited number of cameras through an apparatus for providing image information. In this case, to acquire a wide viewing angle, a fish eye lens or a similar type of wide angle lens may be lens as a lens installed in a camera. However, images acquired by the lens are different from images based on human vision and a lastly output image is a top view type of image compared with a direction of a camera lens installed in a vehicle, and thus, images acquired from a plurality of cameras need to be processed using various image signal processing (ISP) procedures.

Such a series of procedures are required because it is not possible to install a camera in a vehicle to capture a roof of the vehicle from above.

FIGS. 1A to 1C are diagrams showing an output image according to the prior art.

Referring to FIGS. 1A to 1C, a step difference phenomenon of brightness in alpha blending as a correction method is shown in FIG. 1B. A ghost phenomenon in alpha blending as a correction method is shown in FIG. 1C. The ghost phenomenon is a phenomenon whereby an object that is not actually present in a region is displayed like a ghost, and is caused via alpha blending for correcting a pixel corresponding to the corresponding region using surrounding pixels.

DISCLOSURE

Technical Problem

Embodiments provide an image matching method and an image matching apparatus, for preventing and reducing a step difference and a ghost phenomenon of brightness during a procedure of matching a plurality of images through a method of extracting image information during a procedure of matching a plurality of images, determining a correction value based on the extracted value, performing gradual correction on an overlapping region based on the determined correction value, and then, matching correction images.

Embodiments provide an image matching method and an image matching apparatus, for reducing noise in an overlapping region during a procedure of matching a plurality of images by determining a correction value using only image information in an overlapping image in at least two images during a procedure of matching a plurality of images.

Embodiments provide an image matching method and an image matching apparatus, for preventing and reducing a step difference and ghost phenomenon of brightness by determining a difference value of information of at least two images and gradually applying the determined difference value to an overlapping region matched to the plurality of images to correct an image during a procedure of matching a plurality of images.

It is to be understood that both the foregoing general description and the following detailed description of the present disclosure are exemplary and explanatory and are intended to provide further explanation of the present disclosure as claimed.

Technical Solution

In one embodiment, an image matching method includes extracting image information from each of a plurality of different images acquired through a camera apparatus installed in a vehicle, applying gradation according to a correction reference based on the plurality of extracted pieces of image information, and correcting and matching the plurality of images to output a target image.

The image information may include at least one of brightness information and contrast information.

The outputting of the target image may include determining a correction reference value based on the corrected image information, applying the correction reference value as gradation to correct each of the plurality of images, and matching the plurality of corrected images to output a target image.

The plurality of different images may be images that are obtained by transforming images acquired by a plurality of camera apparatuses into a top view form.

The correction reference value may be determined as at least one of an average, a median, a mode, and a standard deviation with respect to a plurality of pieces of image information.

The image matching method may further include setting a non-overlapping region and an overlapping region in the image.

The image information may be extracted from the overlapping region included in each of the plurality of images instead of an entire portion of each of the plurality of images.

The gradation may include linear gradation that is applied in a straight direction of a boundary of the non-overlapping region from the center of the overlapping region.

The gradation may include linear gradation that is applied in a straight direction of an edge of the image from a boundary between the non-overlapping region and the overlapping region.

The gradation may include non-linear gradation applied in a radio direction of an edge of the image from the center of the non-overlapping region.

The outputting of the target image may include extracting data of a region corresponding to a region inserted into the target image in a transformed image, and disposing the extracted data in a preset region in the target image.

The extracting of the image information may include extracting image of a region corresponding to a region inserted into the target image, and extracting the image information from the extracted data.

In the outputting of the target image, the gradation may include linear gradation applied in a straight direction of a boundary of the non-overlapping region from the center of the overlapping region.

In the outputting of the target image, the gradation may include linear gradation applied in a straight direction of an edge from the center of the extracted image.

In the outputting of the target image, the gradation may include a non-linear gradation applied in a radial direction of an edge from the center of the extracted image.

In another embodiment, a computer readable recording medium may have recorded thereon an application program for executing the aforementioned image matching method by a processor.

In another embodiment, an image matching apparatus includes at least one processor and a processing system including at least one memory apparatus having a computer program recorded thereon, and the processing system may perform extracting image information from each of the plurality of different images by the image matching apparatus, and applying a gradation according to a correction reference based on the plurality of extracted pieces of image information, and correcting and matching the plurality of images to output a target image, and the plurality of different images are images obtained by transforming images acquired by a plurality of camera apparatuses into a top view form.

The outputting of the target image may include determining a correction reference value based on the extracted image information, applying gradation as the correction reference value to correct each of the plurality of images, and matching the plurality of corrected images to output a target image.

The processing system may further include setting a non-overlapping region and an overlapping region in the plurality of images by the image matching apparatus.

The image information may be extracted from the overlapping region included in each of the plurality of images instead of an entire portion of each of the plurality of images.

The processing system may further extracting data of a region corresponding to a region inserted into the target image in the plurality of images prior to extraction of the image information by the image matching apparatus.

The processing system may further perform extracting of data of a region corresponding to a region inserted into the target image in the plurality of images after the image matching apparatus corrects the plurality of images.

The outputting of the target image may further include disposing the extracted data in a preset region in the target image.

The image information may include at least one of the brightness information and contrast information, and the correction reference value may be determined as at least one of an average, a median, a mode, and a standard deviation of the plurality of pieces of image information.

In another embodiment, an image matching apparatus includes a setting unit for setting an overlapping region and a non-overlapping region in two different images, an extraction unit for extracting image information of an overlapping region in each of the two images, a determination unit for determining the correction reference value based on the extracted image information, a correction unit for performing correction by applying a correction reference value C0 as gradation to an overlapping region of the two images, and a matching unit for matching two correction images based on the corrected overlapping region.

The image information may include at least one of brightness information and contrast information.

The correction reference value may be determined as at least one of an average, a median, a mode, and a standard deviation with respect to a plurality of pieces of image information.

The gradation may include linear gradation that is applied in a straight direction of a boundary of the non-overlapping region from the center of the overlapping region.

The gradation may include linear gradation that is applied in a straight direction of an edge of the image from a boundary between the non-overlapping region and the overlapping region.

The gradation may include non-linear gradation applied in a radio direction of an edge of the image from the center of the non-overlapping region.

In another embodiment, an image matching method for matching a plurality of source images to generate a target image, the method including photographing a first imaging region through a first camera to acquire a first source image, and photographing a second imaging region including an overlapping region that partially overlaps the first imaging region through a second camera to acquire a second source image including an overlapping region that partially overlaps a portion of the first source image, transforming the first source image and the second source image into a top view and adjusting brightness through auto exposure (AE) to acquire a first transformation image and a second transformation image, acquiring first image information on the overlapping region of the first transformation image and second image information on the overlapping region of the second transformation image, and generating a target image including a first region in the overlapping region in which at least a portion of the first transformation image corrected based on the first image information and the second image information is disposed, and a second region in the overlapping region in which at least a portion of the second transformation image corrected based on the first image information and the second image information is disposed and that does not overlap the first region, and the correction includes gradation correction on the first transformation image disposed on the first region and the second transformation image disposed on the second region.

It is to be understood that both the foregoing general description and the following detailed description of the present disclosure are exemplary and explanatory and are intended to provide further explanation of present disclosure as claimed.

Advantageous Effects

An apparatus according to embodiments may have the following effects.

Embodiments may reduce a brightness step difference of a matched target image due to a brightness difference in a plurality of source images.

Embodiments may reduce a ghost phenomenon in an overlapping region in a target image obtained by matching a plurality of images.

It will be appreciated by persons skilled in the art that the effects that could be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

Arrangements and embodiments may be described in detail with reference to the following drawings in which like reference numerals refer to like elements and wherein.

BEST MODE

Figure 1A:
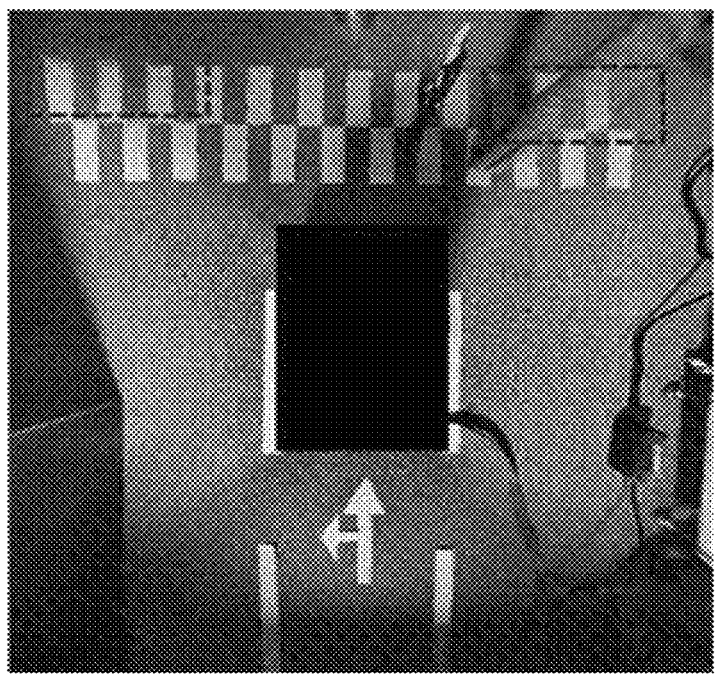
FIGS. 1A to 1C are diagrams showing an output image according to the prior art.
Figure 1B:
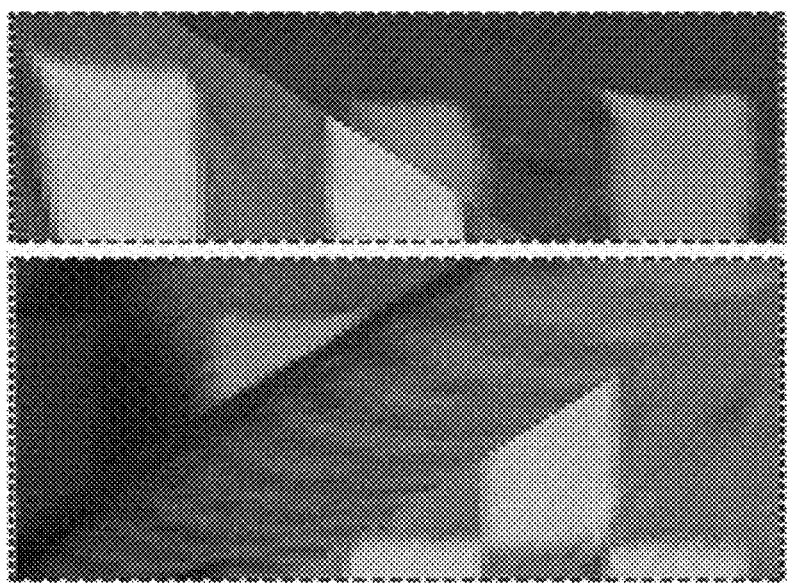
Figure 1C:
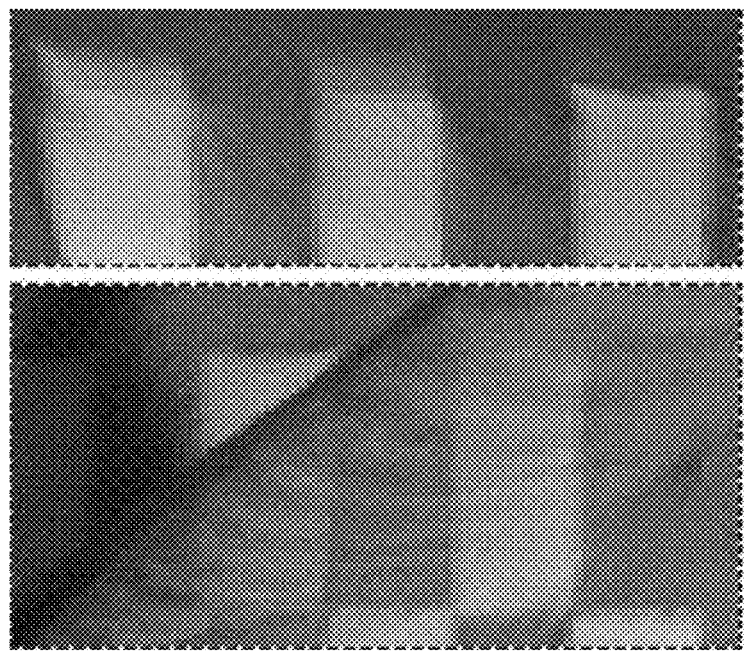

Exemplary embodiments can be variously changed and embodied in various forms, in which illustrative embodiments are shown. However, exemplary embodiments should not be construed as being limited to the embodiments set forth herein and any changes, equivalents or alternatives which are within the spirit and scope of the embodiments should be understood as falling within the scope of the embodiments.

It will be understood that although the terms first, second, etc. may be used herein to describe various elements, these elements should not be limited by these terms. These terms are only used to distinguish one element from another element. For example, a first element may be termed a second element and a second element may be termed a first element without departing from the teachings of the embodiments. The term "and/or" includes any and all combinations of one or more of the associated listed items. As used herein, the term "and/or" includes any and all combinations of one or more of the associated listed items. In addition, the terms first, second, etc. may be understood as one or another rather than being understood as the first or the second.

It will be understood that when an element is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present.

The terms used in the present disclosure are used for explaining a specific exemplary embodiment, not limiting the present disclosure. Thus, the singular expressions in the present disclosure include the plural expressions unless clearly specified otherwise in context. Also, terms such as "include" or "comprise" may be construed to denote a certain characteristic, number, step, operation, constituent element, or combination thereof, but may not be construed to exclude the existence of or possibility of addition of one or more other characteristics, numbers, steps, operations, constituent elements, or combinations thereof.

Unless otherwise defined, all terms including technical and scientific terms used herein have the same meaning as commonly understood by one of ordinary skill in the art to which the present disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Reference will now be made in detail to the embodiments, examples of which are illustrated in the accompanying drawings. In the drawings, the same reference numerals in the drawings denote the same element, and a repeated explanation thereof will not be given.

In the present disclosure, the terms first camera and second camera and the terms first imaging region and second imaging region are used, but these are merely exemplary, and thus, it may be understood that the embodiments include second and third components. That is, similarly to first to fourth cameras, and first to fourth imaging regions, first to fourth source images, first to fourth transformation images, and first and second regions are included in the embodiments.

Hereinafter, an image matching apparatus according to an embodiment will be described.

Figure 2:
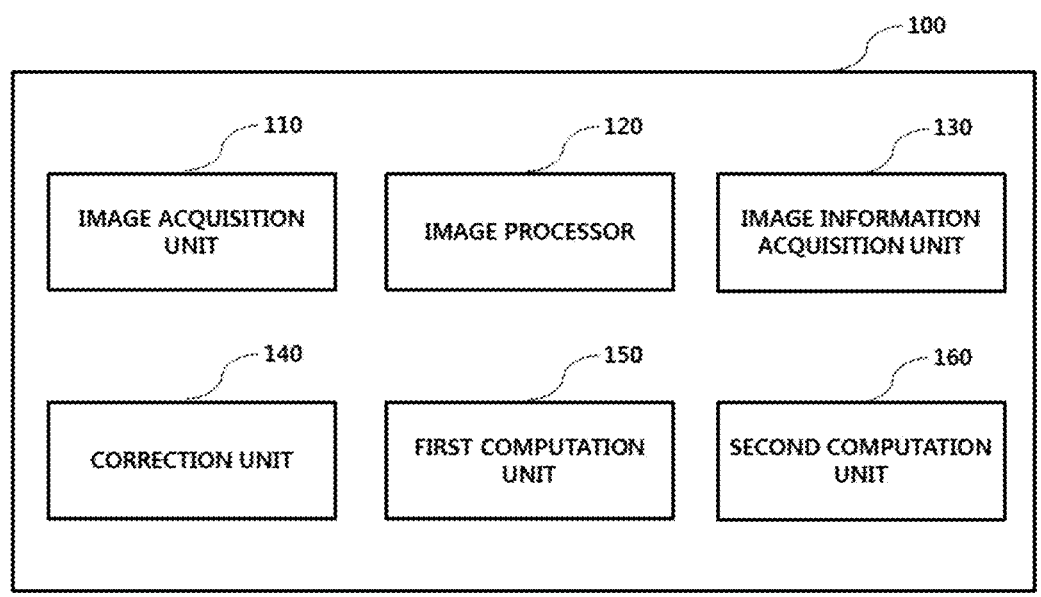
FIG. 2 is a block diagram of an image matching apparatus according to an embodiment.

FIG. 2 is a block diagram of an image matching apparatus according to an embodiment.

Referring to FIG. 2, an image matching apparatus 100 may include an image acquisition unit 110, an image processor 120, an image information acquisition unit 130, and a correction unit 140, and may further include a first computation unit 150 and a second computation unit 160.

The image matching apparatus 100 may match a plurality of source images to generate a target image.

The image acquisition unit 110 may photograph a first imaging region to acquire a first source image through a first camera and may photograph a second imaging region to acquire a second source image including an overlapping region that overlaps a portion of the first source image through a second camera. Accordingly, the image acquisition unit 110 may be implemented through a camera. The camera may be a camera module installed a front side, a right side, a rear side, and a left side of a vehicle.

The image processor 120 may convert a display mode of the first source image and the second source image into a top view and may adjust brightness through auto exposure (AE). Accordingly, a first transformation image and a second transformation image may be acquired.

The image information acquisition unit 130 may acquire first image information of the first transformation image and second image information of the second transformation image. Here, the image information may include RGB values, brightness, etc. of pixels configuring an image. The image information may include pixel information represented using a method other than RGB.

The correction unit 140 may generate the target image including a first region in the overlapping region in which a pixel of the first transformation image corrected based on the first image information and the second image information is disposed, and a second region in the overlapping region in which a pixel of the second transformation image corrected based on the first image information and the second image information is disposed and that does not overlap the first region. That is, the correction unit 140 may correct pixels of an image and may match transformation images to generate a target image. Here, correction may include gradation correction for adjusting brightness or color of a pixel of the first transformation image disposed in the first region and a pixel of the second transformation image disposed in the second region.

The first computation unit 150 may acquire a brightness ratio of the first transformation image to the second transformation image using brightness of transformation images.

The second computation unit 160 may compute a gain for correction of the transformation image using the brightness ratio.

Here, the correction unit 140 may set a correction degree and a correction region and may correct pixels of transformation images based on the brightness gain, and in this case, the correction unit 140 may separate pixels of each overlapping region, may correct an original using a pixel of the source image close to the first region as the original among two overlapping source images with respect to the first region, and may correct an original using a pixel of the remaining source image close to the second region as the original among the two overlapping source images with respect to the second region to generate the target image to match the source images based on the overlapping region.

The image matching apparatus 100 may further include a storage unit that is not shown in the drawings. The storage unit may store the image in a volatile memory or a non-volatile memory in order to provide an image to a corresponding component in an order in which functions of components are performed.

The image processor 120, the image information acquisition unit 130, the correction unit 140, the first computation unit 150, and the second computation unit 160 may execute a program command stored in a memory. The image processor 120, the image information acquisition unit 130, the correction unit 140, the first computation unit 150, and the second computation unit 160 may refer to a central processing unit (CPU), a graphics processing unit (GPU), or a dedicated processor for performing methods according to embodiments.

The memory may include a volatile storage medium and/or a non-volatile storage medium. For example, the memory may include a read only memory (ROM) and/or a random access memory (RAM).

In some embodiments, the image matching apparatus 100 may receive Bayer pattern information from a plurality of cameras and may optionally perform operations such as color interpolation and demosaicing, color correction, gamma correction, color space conversion, and edge enhancement. When the Bayer pattern information is received from the plurality of cameras and data is processed and matched, a procedure of collecting, processing, and matching the Bayer pattern information of the image matching apparatus 100 may be performed by one image processor.

Hereinafter, an image matching method according to another embodiment will be described.

Figure 3:
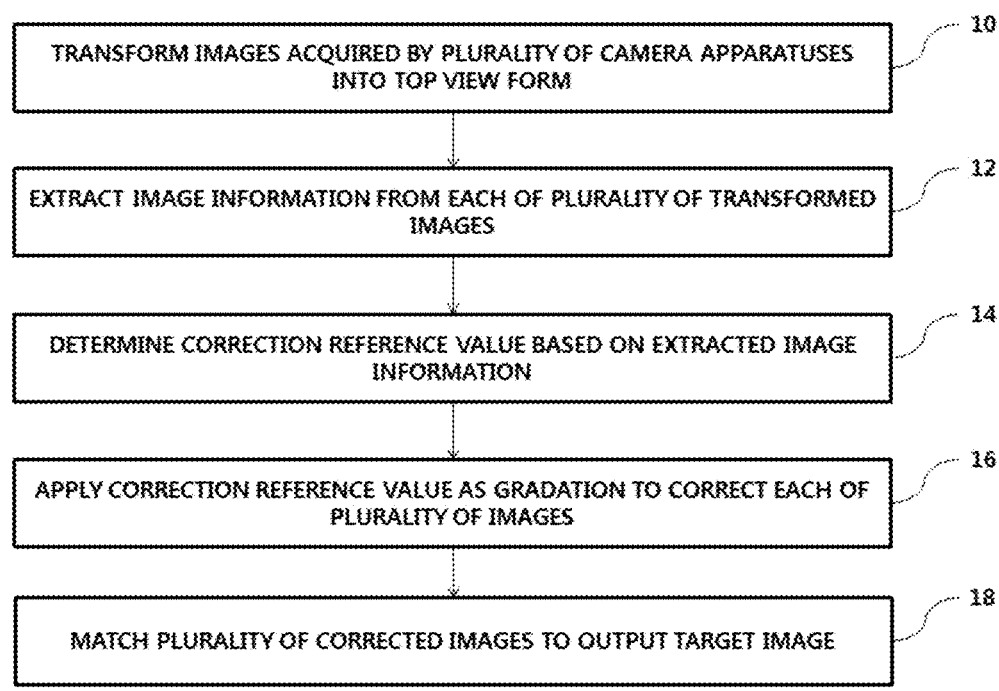
FIG. 3 shows an image matching method.

FIG. 3 shows an image matching method.

Referring to FIG. 3, the image matching method may include extracting an image from each of a plurality of different images acquired through a camera apparatus installed in a vehicle, and applying gradation according to a correction reference based on the plurality of extracted image information items, correcting and matching a plurality of images, and outputting a target image.

In more detail, the image matching method may include transforming images acquired by a plurality of camera apparatuses into a top view form (10), extracting image information from each of the plurality of transformed images (12), determining a correction reference value based on the extracted image information (14), applying a correction reference value as gradation to correct each of the plurality of images (16), and matching the plurality of correction images to output a target image (18).

Although not shown, the outputting of the target image (18) may include extracting data in a region corresponding to a region to be inserted into the target image in the correction image, and disposing the extracted data on a preset region in the target image.

When a plurality of cameras is installed in a vehicle, images of front, rear, right, and left images of the vehicle may be acquired. When each of the images are displayed to a driver or a user, the driver or the user may advantageously acquire surrounding information of the vehicle, but when the images are separately displayed, it may be difficult to recognize a surrounding situation of the vehicle. Accordingly, when an image is provided to a driver or a user, like an image (e.g., a top view image) acquired by matching images acquired in different directions based on the vehicle and viewed from above of the vehicle, the driver or the user may easily recognize the surrounding information of the vehicle.

To transform an image acquired by a camera into the form of a top view image, it may be required to remove a perspective effect of objects in the image. When there is information on the height and angle at which a camera is installed in a vehicle, and horizontal and vertical viewing angles of the camera, a relationship between an image plane acquired by the camera and an actual plane (a target image plane in the form of top view) to be viewed to a driver or a user may be recognized. Based on the relationship, the image plane acquired by the camera may be converted into the plane to be viewed to the user.

Then, image information may be extracted from the plurality of transformed images (12). The respective images are acquired by cameras disposed at different positions and are captured by photographing objects in different directions, and thus, the images inevitably have different amounts of light. For example, when images with different brightness are simply combined, an image that causes confusion to the driver or the user due to noise, etc. may also be provided. To prevent this, it may be required to extract information on a corresponding image before images are matched. For example, image information may include at least one of brightness information and contrast information.

Although not shown, the image matching method may further include setting a non-overlapping region and an overlapping region in each image in order to extract image information. In this case, the image information may be extracted from an overlapping region included in each of a plurality of images rather than an entire portion of each of the plurality of images.

In some embodiments, the extracting of the image information (12) may include extracting data of a region corresponding to a region inserted into the target image in the plurality images, and extracting image information from the extracted data. When only some of images acquired by a plurality of different cameras are used to generate the target image, it may not be required to perform a correction operation on all images. Accordingly, when the plurality of acquired images are pre-acquired to correspond to the target image, a time period taken to compute a correction target region or a correction may be reduced during subsequent correction of an image.

When image information is extracted from each image, a correction reference value may be determined based on the image information (14). Here, the correction reference value may be determined as at least one of an average, a median, a mode, and a standard deviation with respect to a plurality of pieces of image information. The correction reference value may be determined depending on a ratio or difference value between two pieces of image information.

When the correction reference value is determined, each image may be corrected (16). In this case, an entire portion of an image may not be corrected using the correction reference value, but instead, only a region that overlaps another image may be corrected using the correction reference value. For example, a linear gradation method applied in a straight direction of a boundary of a non-overlapping region from the center of an overlapping region may be applied to image correction.

In some embodiments, a linear gradation method applied in a straight direction of an edge of an image from a boundary between a non-overlapping region and an overlapping region in an image may be performed for image correction.

In some embodiments, a non-linear gradation method applied in a radial direction of an edge of an image from the center of a non-overlapping region in an image may also be performed for image correction.

When an image is pre-extracted to correspond to the target image, an image may be corrected using a linear or non-linear gradation method in a straight or radial direction of an edge from the center of the image.

Two different images may be corrected using the aforementioned method and then may be matched (18).

The aforementioned image matching method may be different from an alpha blending method that is used for conventional image matching. First, alpha blending refers to a scheme for achieving a transparent or translucent effect, etc. or an effect of mixing two image colors via computation for mixing an alpha value when an image is covered by another image. However, alpha blending has high possibility that noise is generated or an image is distorted while two image values are matched through an alpha value. Alpha blending disadvantageously causes a ghost phenomenon whereby two objects are displayed to overlap each other.

On the other hand, the aforementioned image matching method pre-corrects overlapping regions of two different images on which matching, coupling, covering, etc. are performed, using image information on each other and then the two different images are matched based on the corrected overlapping regions, and thus, a step difference of a brightness degree between the two different images may pre-counterbalance and a ghost phenomenon in alpha blending may be prevented.

Figure 4:
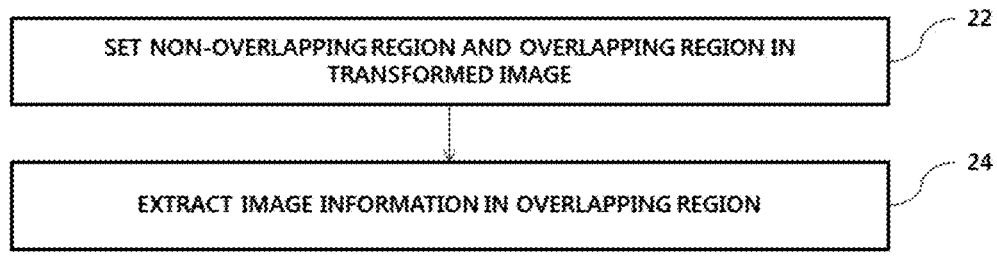
FIG. 4 is a diagram for explanation of a first example of an image information extraction method.

FIG. 4 is a diagram for explanation of a first example of an image information extraction method.

Referring to FIG. 4, the method of extracting image information from a plurality of images may include setting a non-overlapping region and an overlapping region in a transformed image (22) and extracting image information in the overlapping region (24).

Here, the image information may include at least one of brightness information and contrast information. In this case, an overlapping region in each a plurality of images may be analyzed and corrected, and a non-overlapping region (unique region) in an image may not be analyzed and corrected.

Figure 5:
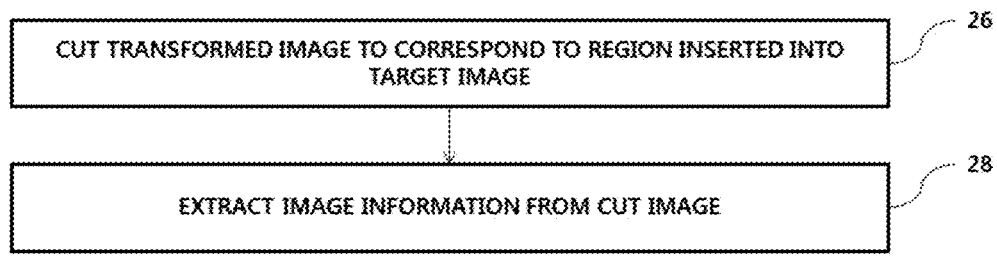
FIG. 5 is a diagram for explanation of a second example of an image information extraction method.

FIG. 5 is a diagram for explanation of a second example of an image information extraction method.

Referring to FIG. 5, the method of extracting image information from a plurality of images may include disposing and cutting a transformed image to correspond to a region inserted into a target image (26) and extracting image information from the cut image (28).

Here, the image information may include at least one of brightness information and contrast information. In this case, an image region that is not used among a plurality images may be pre-cut and removed, and then, an image may be analyzed and processed, thereby reducing resources consumed to analyze and process the image.

Figure 6:
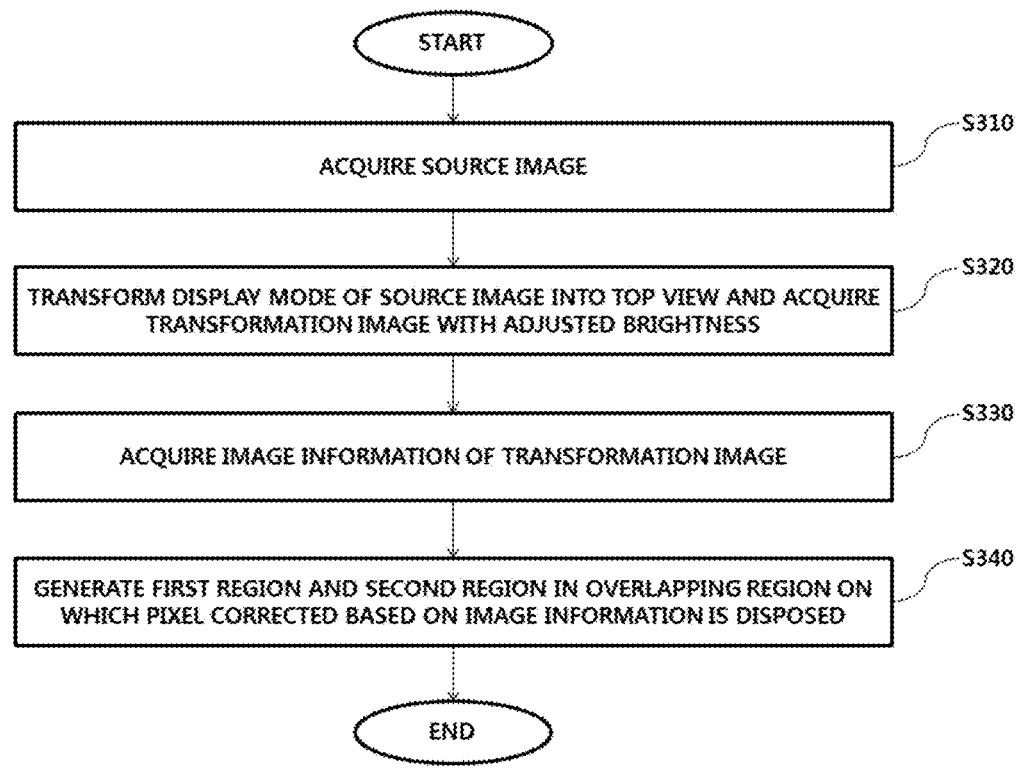
FIG. 6 is a flowchart of an image matching method.

FIG. 6 is a flowchart of an image matching method.

Referring to FIG. 6, the image acquisition unit 110 may acquire a source image using a camera (S310). Here, the number of source images may be two or greater. When a camera is installed in a vehicle, four source images may be acquired by four cameras. However, embodiments are not limited thereto, and an additional source image may be further acquired due to additional installation of a camera. Here, each source image may be acquired to overlap each other. That is, two source images commonly include the same subject region, and thus, two source images may be connected to each other based on the subject region.

Then, the image processor 120 may convert a display mode of the source images into a top view and may adjust brightness via auto exposure (AE) to acquire a transformation image (S320). In this operation, two or greater, in detail, two transformation images may be acquired.

Then, the image information acquisition unit 130 may acquire image information of the transformation image (S330). In this operation, two or greater, in detail, two pieces of image information may also be acquired.

Then, the correction unit 140 may generate a target image including a first region in the overlapping region in which a pixel of the first transformation image corrected based on the first image information and the second image information is disposed, and a second region in the overlapping region in which a pixel of the second transformation image corrected based on the first image information and the second image information is disposed and that does not overlap the first region (S340). Here, correction may include gradation correction on the pixel of the first transformation image disposed on the first region and the pixel of the second transformation image disposed on the second region. In this operation, correction may be performed on first to eighth regions including two or greater, in detail, four overlapping regions.

Hereinafter, a correction method will be described in detail.

Figure 7:
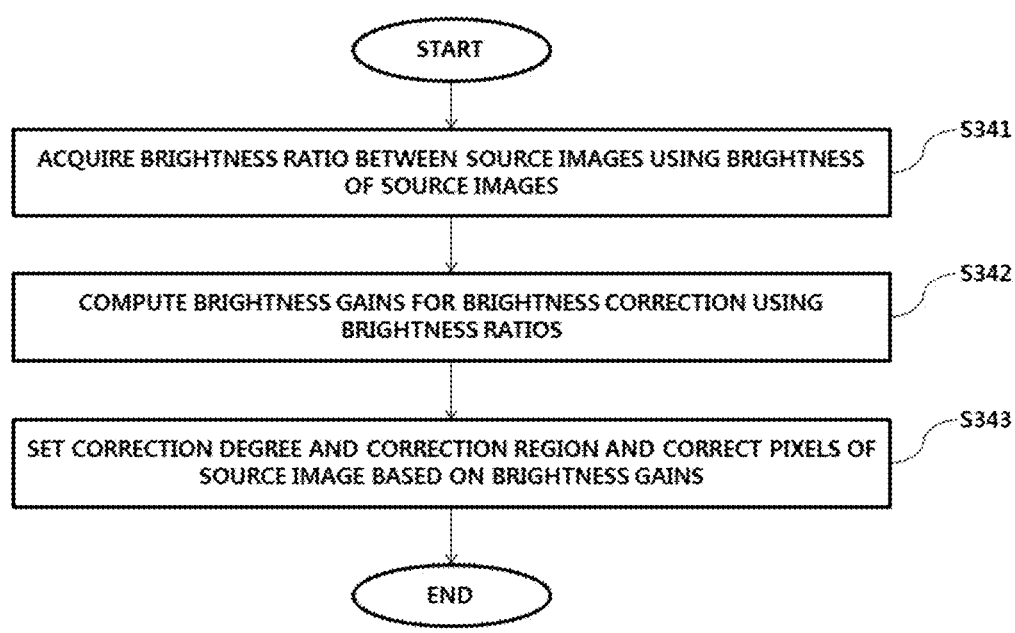
FIG. 7 is a flowchart of operations included in S340 of FIG. 6.

FIG. 7 is a flowchart of operations included in S340 of FIG. 6.

Referring to FIG. 7, the first computation unit 150 may acquire a brightness ratio of the first transformation image to the second transformation image using brightness of the transformation images (S341). Expressions 1 below represent brightness ratios R1, R2, R3, and R4.

$$R_1=L_1/L_2, R_2=L_3/L_4, R_3=L_5/L_6, R_4=L_7/L_8 \qquad \text{[Expression 1]}$$

In Expression 1 above, $L_1$ to $L_8$ represent brightness of first to eighth regions.

Figure 8:
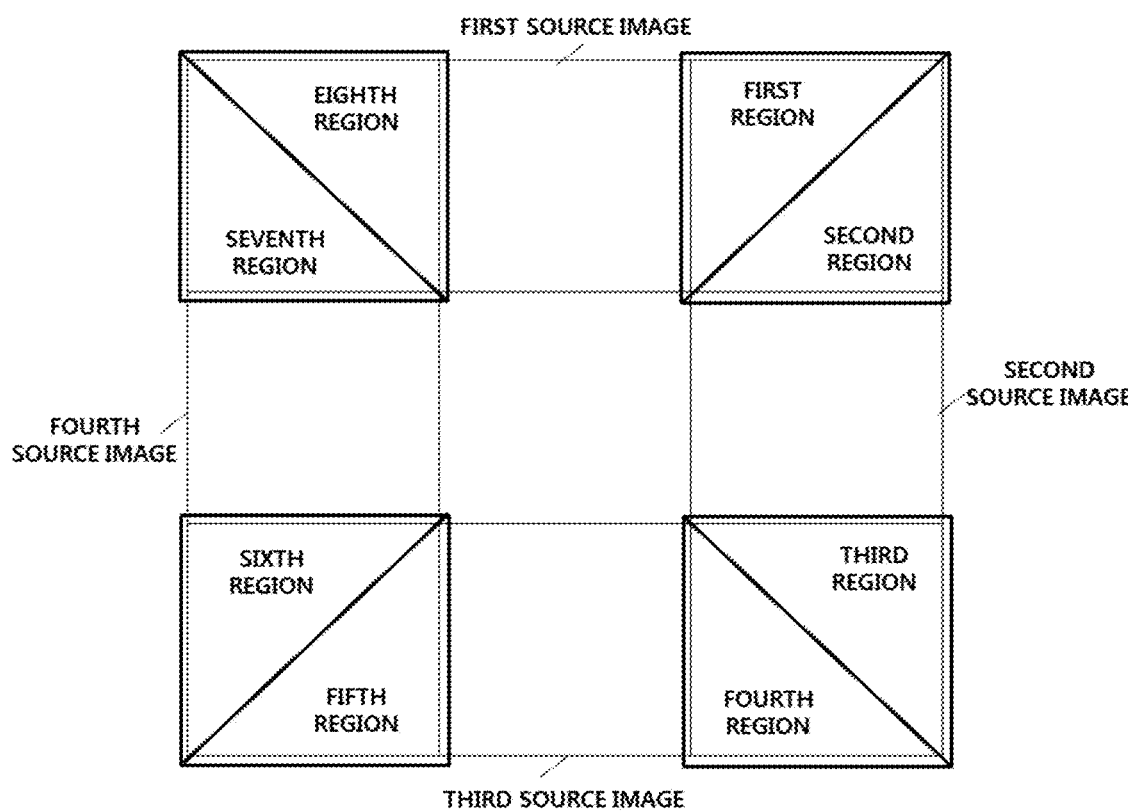
FIG. 8 is a schematic diagram of a target image for explanation of terms used in the present disclosure.

FIG. 8 is a schematic diagram of a target image for explanation of terms used in the present disclosure.

Referring to FIG. 8, first to fourth images and first to eighth regions are illustrated on the target image. In addition, the first to eighth regions are illustrated. Here, the first and second regions may correspond to an overlapping region as an example. Four overlapping regions may be formed on the target image.

Average brightness may be used as brightness of each region.

A brightness ratio with a corrected error may be used as each brightness ratio. Expression 2 below represents a brightness ratio with a corrected error.

$$R'_k = R_k \cdot (R_1 \cdot R_2 \cdot R_3 \cdot R_4)^{(1/4)} \qquad \text{[Expression 2]}$$

Then, the second computation unit 160 may compute a brightness gain for correction of a transformation image using a brightness ratio (S342).

Expression 3 below represents an average of a brightness ratio required in a procedure for gain computation. Each element of a right term represents a factor that is multiplied when the first to fourth source images are corrected with brightness of the first source image. A value obtained by dividing the actor with 4 may be an average of a brightness ratio.

$$R'_{AVER} = (1 + 1/R'_1 + R'_4 - R'_3 + R'_4)/4 \qquad \text{[Expression 3]}$$

Expression 4 below represents brightness gains $G_1$, $G_2$, $G_3$, and $G_4$. Each brightness gain may be calculated by dividing the factor with an average of the brightness ratio.

$$G_1 = 1/R'_{AVER}$$

$$G_2 = (1/R'_1)/R'_{AVER}$$

$$G_3 = (R'_4 \cdot R'_3)/R'_{AVER}$$

$$G_4 = R'_4/R'_{AVER} \qquad \text{[Expression 4]}$$

Then, the correction unit 140 may set a correction degree and a correction region and may correct pixels of the transformation image based on the brightness gain (S343).

Expression 5 shows that a pixel value is changed on a first region via correction. $P_1$ is a pixel value before correction and $P_1'$ is a pixel value after correction. Here, parameter C is a correction degree and parameter M1 is a correction region. The correction degree may be related to independency corresponding to a degree of the first to eight regions or the first to fourth source images.

$$P_1' = P_1 \cdot \{((1/R_4 - 1) \cdot M_1 + 1) \cdot C + G_1 \cdot (1 - C)\} \qquad \text{[Expression 5]}$$

Figure 9A:
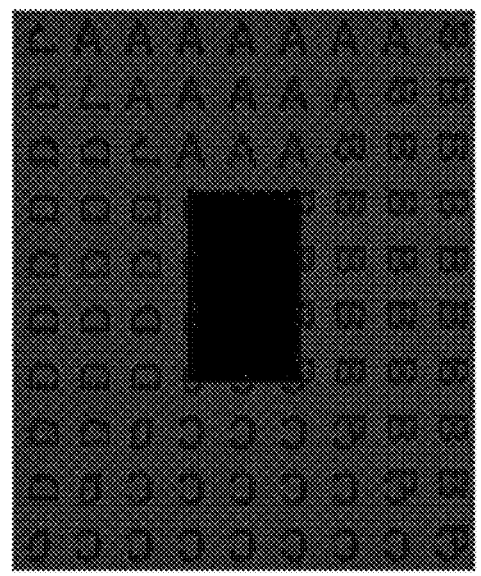
FIGS. 9A to 9C are diagrams showing a target image that is differently corrected depending on a size of parameter C.
Figure 9B:
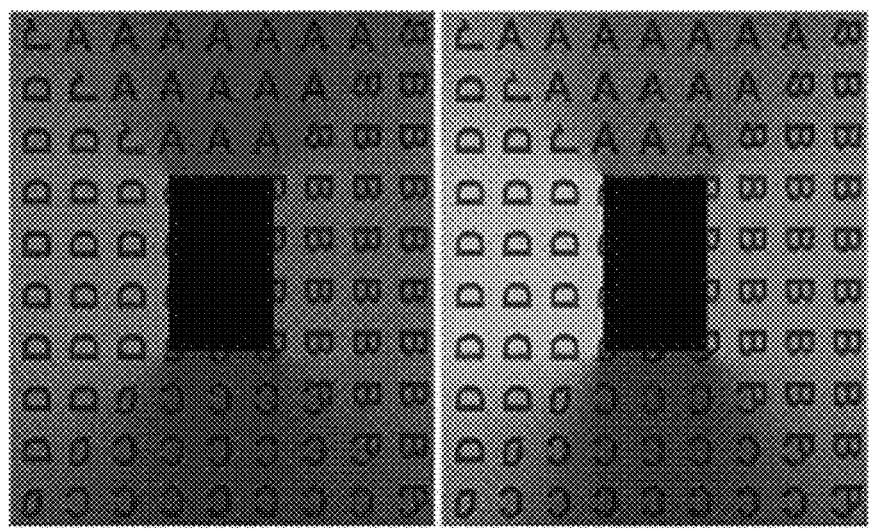
Figure 9C:
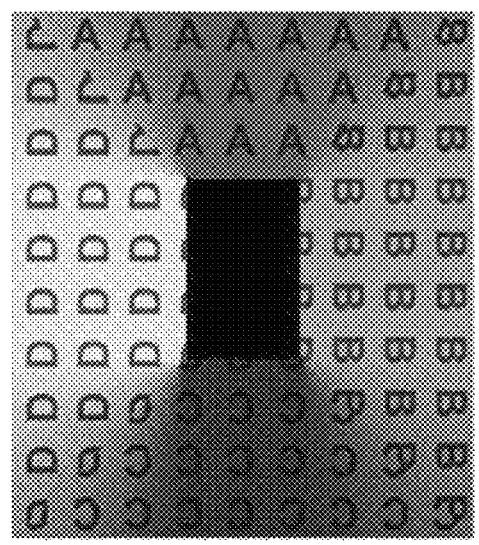

FIGS. 9A to 9C are diagrams showing a target image that is differently corrected depending on a size of parameter C.

Referring to FIG. 9A, FIG. 9A illustrates the case in which C is 0. Referring to FIG. 9B, FIG. 9B illustrates the case in which C is 0.3 and 0.7. Referring to FIG. 9C, FIG. 9C illustrates the case in which C is 1. Accordingly, parameter C may be adjusted to adjust whether each source image is independently corrected or is dependently corrected by increasing influence between source images. When C is 0, pixels may be corrected to achromatic color.

Here, pixels of each overlapping region may be separated into the first region and the second region and may be corrected. With respect to the first region, an original may be corrected using a pixel of the source image close to the first region as the original among two overlapping source images.

With respect to the second region, an original may be corrected using a pixel of the remaining source image close to the second region as the original among the two overlapping source images.

As a result, source images may be matched based on the overlapping region to generate the target image.

In addition, correction of pixels on the second to eighth regions may be represented according to Expression 6 below.

$$P'_2 = P_2 \cdot \{((R_1 - 1) \cdot M_1 + 1) \cdot C + G_1 \cdot (1 - C)\}$$

$$P'_3 = P_3 \cdot \{((R_1 - 1) \cdot M_2 + 1) \cdot C + G_2 \cdot (1 - C)\}$$

$$P'_4 = P_4 \cdot \{((R_2 - 1) \cdot M_2 + 1) \cdot C + G_2 \cdot (1 - C)\}$$

$$P'_5 = P_5 \cdot \{((1/R_2 - 1) \cdot M_3 + 1) \cdot C + G_3 \cdot (1 - C)\}$$

$$P'_6 = P_6 \cdot \{((R_3 - 1) \cdot M_1 + 1) \cdot C + G_1 \cdot (1 - C)\}$$

$$P'_1 = P_1 \cdot \{((1/R_3 - 1) \cdot M_1 + 1) \cdot C + G_1 \cdot (1 - C)\}$$

$$P'_6 = P_6 \cdot \{((R_4 - 1) \cdot M_4 + 1) \cdot C + G_1 \cdot (1 - C)\} \qquad \text{[Expression 6]}$$

Figure 10:
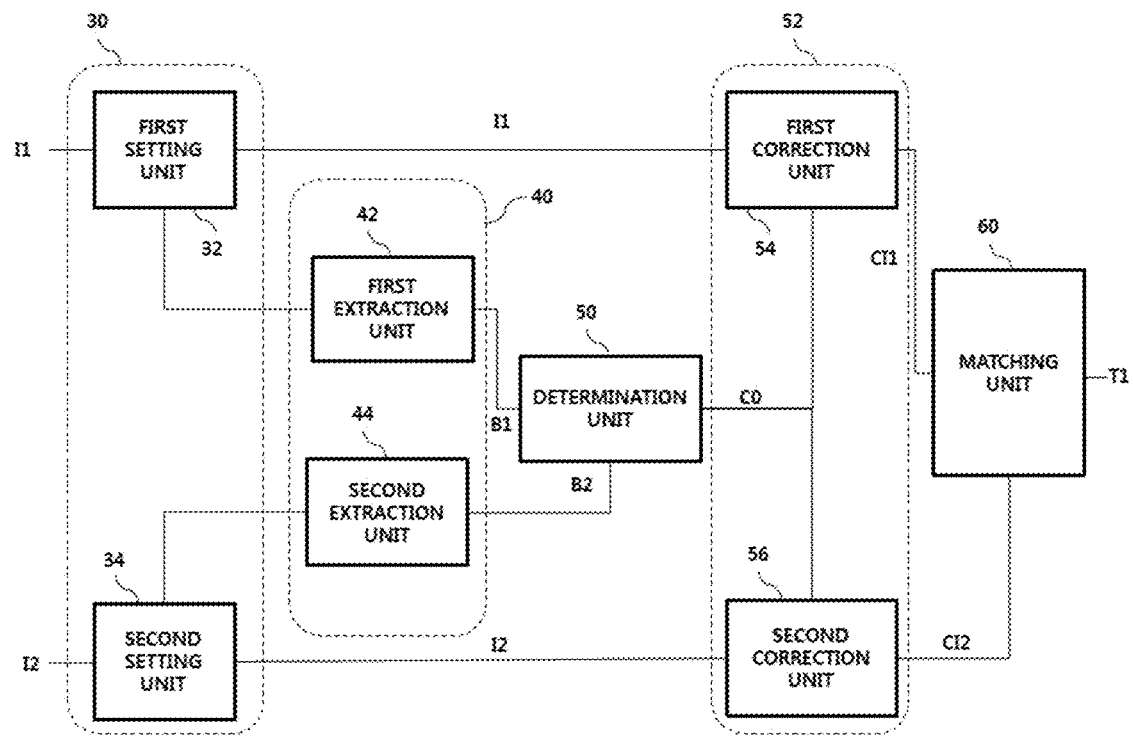
FIG. 10 is a diagram for explanation of a first example of an image matching apparatus.

FIG. 10 is a diagram for explanation of a first example of an image matching apparatus.

Referring to FIG. 10, the image matching apparatus may include a setting unit 30 for setting an overlapping region and a non-overlapping region in two different images I1 and I2, an extraction unit 40 for extracting image information B1 and B2 of an overlapping region in each of the two images, a determination unit 50 for determining the correction reference value C0 based on the extracted image information B1 and B2, a correction unit 52 for performing correction by applying a correction reference value C0 as gradation to an overlapping region of the two images I1 and I2, and a matching unit 60 for matching two correction images CI1 and CI2 based on the corrected overlapping region. Here, an apparatus for matching the two images I1 and I2 is described as an example of the image matching apparatus. When the image matching apparatus matches two or more images, the number of components required to correct each image may be increased.

In more detail, the setting unit 30 may include a first setting unit 32 for receiving a first image I1 to set an overlapping region with a second image I2 in the first image I1 and a non-overlapping region (unique region), and a second setting unit 34 for receiving the second image I2 to set an overlapping region in which the first image I1 and a second image I2 overlap each other and a non-overlapping region (unique region).

The extraction unit 40 may include a first extraction unit 42 for extracting first image information B1 of the overlapping region in the first image I1 and a first extraction unit 44 for extracting second image information B2 of an overlapping region in the second image I2. In this case, the first and second image information B1 and B2 acquired by the extraction unit 40 may include at least one of brightness information and contrast information in an overlapping region with the first image I1 in the second image I2. However, the first and second image information B1 and B2 need to be the same type of information for correction.

The determination unit 50 may determine the correction reference value C0 based on the first and second image information B1 and B2. Here, the correction reference value C0 may be determined as at least one of an average, a median, a mode, and a standard deviation of the plurality of pieces of image information B1 and B2. The correction reference value C0 may be determined as a ratio to each other based on the plurality of pieces of the image information B1 and B2. The correction reference value C0 determined using this method may be used for correction with reference to information on different imagers in order to correct an overlapping region of the two different images I1 and I2.

The correction unit 52 may include a first correction image CI1 for correcting the first image I1 based on the correction reference value C0 to output a first correction image CI1, and a second correction unit 56 for correcting the second image I2 based on the correction reference value C0 to output a second correction image CI2. In some embodiments, the first correction unit 54 and the second correction unit may perform a linear gradation method applied in a straight direction of an edge of an image from a boundary between a non-overlapping region and an overlapping region in an image in order to correct the first image I1 and the second image I2.

In some embodiments, the first correction unit 54 and the second correction unit 56 may also perform a non-linear gradation method applied in a radial direction of an edge of an image from the center of a non-overlapping region in an image in order to correct the first image I1 and the second image I2.

The first correction image CI1 and the second correction image CI2 that are corrected through the correction unit 52 may be transmitted to the matching unit 60, and the matching unit 60 may dispose the first correction image CI1 and the second correction image CI2 based on the overlapping region of the first correction image CI1 and the overlapping region of the second correction image CI2 and then may combine the two images. Through this method, the matching unit 60 may output a target image TI.

Figure 11:
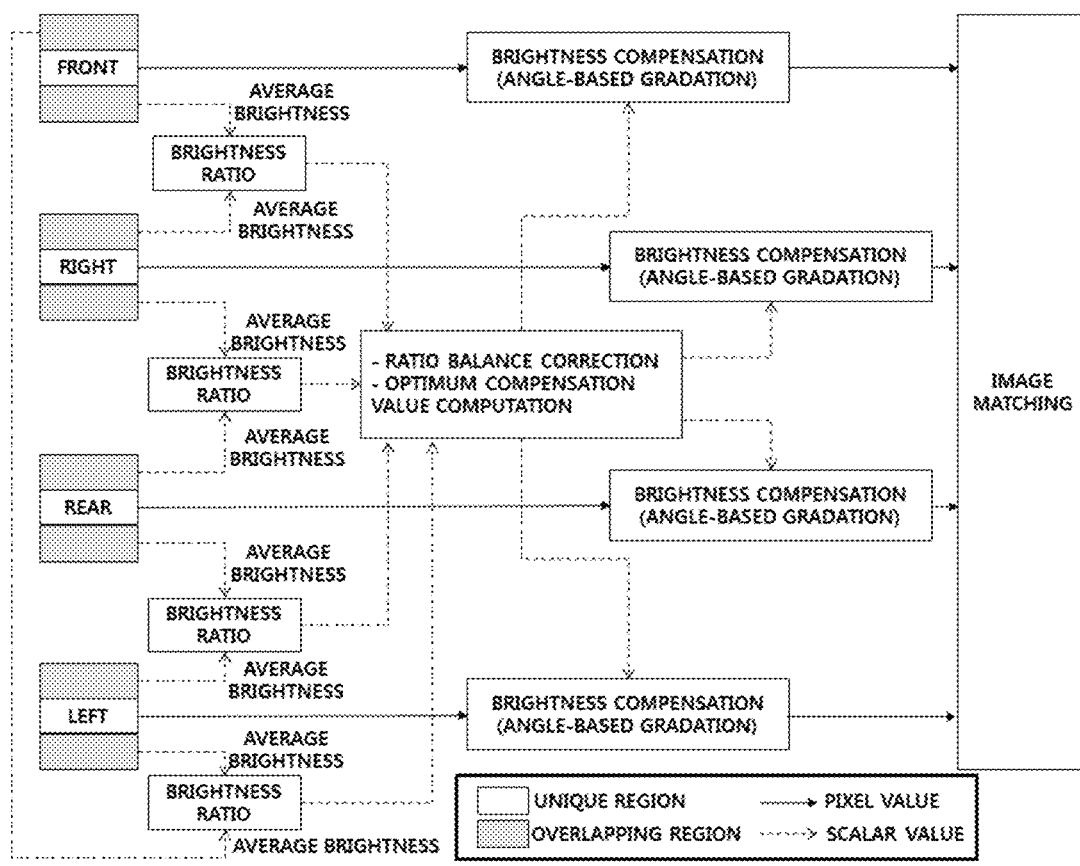
FIG. 11 is a diagram for explanation of a second example of an image matching apparatus.

FIG. 11 is a diagram for explanation of a second example of an image matching apparatus.

Referring to FIG. 11, first to fourth transformation images indicated by front, right, rear, and left may be used. Here, it would be obvious that a source image is used instead of a transformation image. Each transformation image may include a unique region and an overlapping region. An entire overlapping region may be divided into 8 parts (first to eight regions). A solid line refers to a pixel value and a dashed line refers to a scalar value.

The image information acquisition unit 130 may acquire average brightness of an image in an overlapping region. A brightness ratio between regions may be calculated based on the acquired average brightness. In addition, an optimum compensation value for correction of ratio balance may be calculated based on the brightness ratio. A correction range may be set in an angle range of 0 to 90 degrees based on a central point position at a boundary line on an overlapping region. Lastly, an image on an overlapping region may be corrected to achieve gradation based on an angle.

As described above, in the image matching method according to embodiments, a brightness step difference and a ghost phenomenon via a typical alpha blending may be prevented. This effect may be identified through the drawings.

Figure 12A:
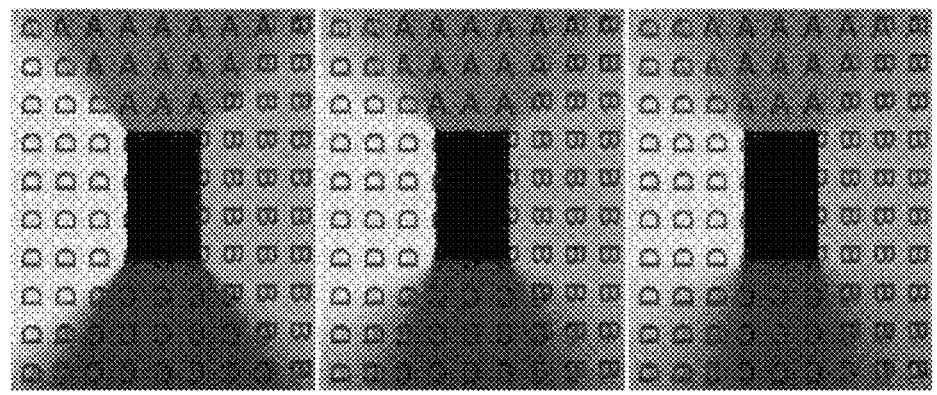
FIG. 12A us a diagram showing an example of target images matched using an alpha blending method.

FIG. 12A us a diagram showing an example of target images matched using an alpha blending method.

Referring to FIG. 12A, the target images may correspond to correction ranges of 30 degrees, 60 degrees, and 90 degrees. As seen from FIG. 12A, as a correction range is increased, a degree of a ghost phenomenon becomes serious.

Figure 12B:
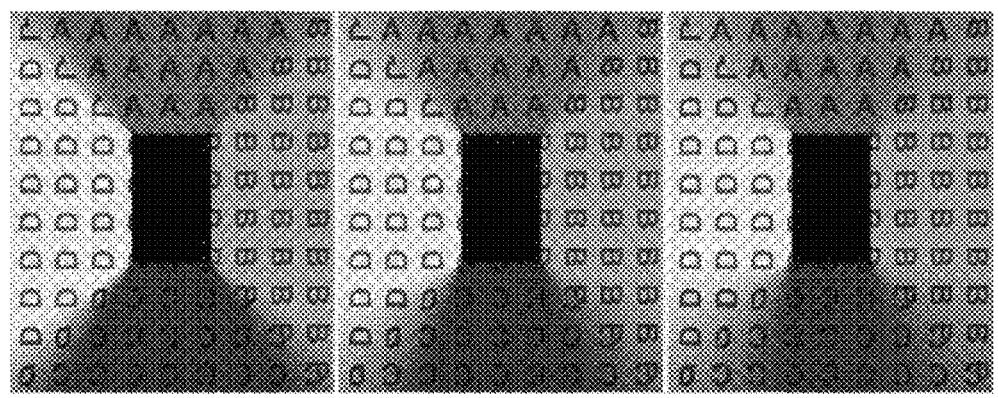
FIG. 12B is a diagram for explanation of matched target images according to an embodiment.

FIG. 12B is a diagram for explanation of matched target images according to an embodiment.

As seen from FIGS. 12B and 12A, when an image of an overlapping region is corrected using an image matching method according to an embodiment, a brightness step difference and a degree of a ghost phenomenon become weak.

Figure 12C:
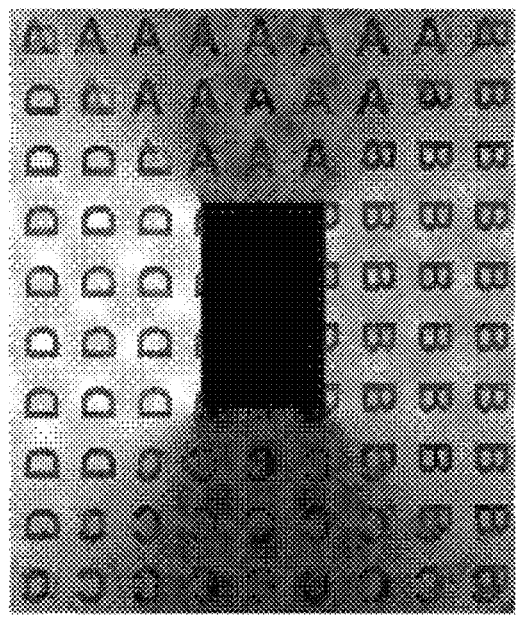
FIG. 12C is a diagram for explanation of an example of a target image corrected via alpha blending and a target image corrected according to an embodiment.

Lastly, FIG. 12C is a diagram for explanation of an example of a target image corrected via alpha blending and a target image corrected according to an embodiment.

As seen from FIG. 12C, an effect whereby a brightness step difference and a ghost phenomenon are reduced is higher than in the case of FIG. 12B in which an embodiment is used alone.

Figure 13:
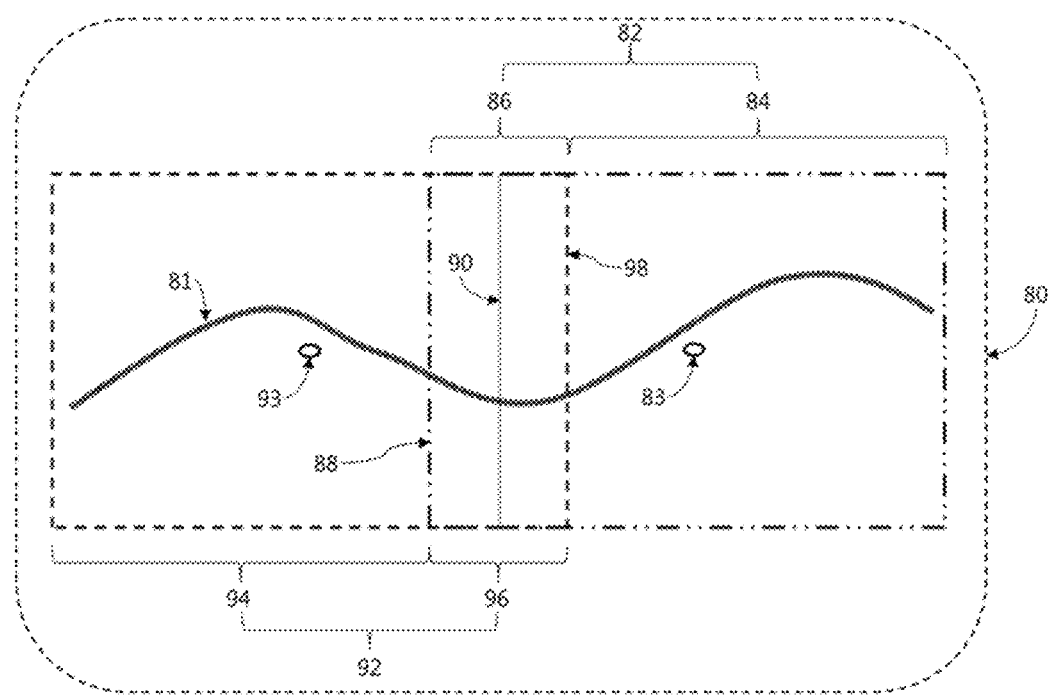
FIG. 13 is a diagram showing an example of the matched image described with reference to FIGS. 12A to 12C in more detail.

FIG. 13 is a diagram showing an example of the matched image described with reference to FIGS. 12A to 12C in more detail. As described above, an image with high quality may be achieved using a matched image output by the image matching apparatus compared with the case in which a typical alpha blending scheme is applied. Here, a result to be output by the image matching apparatus or the image processing apparatus will be described in more detail. For convenience of description, an example in which two different images 92 and 82 are matched to generate one matching image 80 will be described.

First, each of two different images, that is, a first image 92 and a second image 82 may include non-overlapping regions 94 and 84 and overlapping regions 96 and 86. Here, the overlapping region 96 of the first image 92 and the overlapping region 86 of the second image 82 may overlap each other. When the first image 92 and the second image 82 are matched using this method, one image may be acquired using information (continuous information 81 or information items that are not continuous but have different directions) which is not capable of being acquired from one camera apparatus.

Here, the first image 92 and the second image 82 are captured by different camera apparatuses and have different environment for capturing an image, and thus, may have different image brightness. Accordingly, when the first image 92 and the second image 82 are matched without any correction, information provided to a user may be distorted or the user may experience inconvenience due to a brightness difference between two images. To overcome this, image brightness may be partially adjusted.

For example, a first boundary 90 may be formed at the center of the overlapping region 96 of the first image 92 and the overlapping region 86 of the second image 82, a second boundary 88 formed between the overlapping region 96 and the non-overlapping region 94 of the first image 92, and another second boundary 98 may be formed between the overlapping region 86 and the non-overlapping region 84 of the second image 82.

When information on image brightness of each of the first image 92 and the second image 82 is present, a correction reference may be set based on the information. For example, the correction reference may be at least one of an average, a median, a mode, and a standard deviation. The correction reference may be applied to the first boundary 90, and then, gradation may be applied to opposite second boundaries 88 and 98 based on the first boundary 90 to correct image brightness of the overlapping region 96 of the first image 92 and the overlapping region 86 of the second image 82. When image brightness of the overlapping region 96 of the first image 92 and the overlapping region 86 of the second image 82 are corrected, and then, two images, that is the first image 92 and the second image 82 are matched, unnaturalness may be removed from the matched image 80 and a matched image with high quality may be acquired.

In some embodiments, gradation applied in a direction toward the opposite second boundaries 88 and 98 may be linear or non-linear based on the first boundary 90.

In some embodiments, gradation may be applied in a direction toward the first boundary 90 from the opposite second boundaries 88 and 98 to correct image brightness.

In some embodiments, image brightness may be corrected in a linear or radial direction to the first boundary 90 from a central portion 93 of the first image 92 and a central portion 83 of the second image 82. In this case, linear or non-linear gradation may be applied.

The aforementioned first boundary 90, second boundaries 88 and 98, and central portions 83 and 93 are not a reference point to be actually provided to the user, but may be a virtual reference to be internally set by the image processing apparatus in order to correct image brightness.

For convenience of description of embodiments, FIG. 2 or 10 illustrates and exemplifies components as different blocks, respectively, but each component may be configured as one block. For example, each block may be configured in a controller, a processor, or the like to perform the aforementioned series of operations.

While the exemplary embodiments have been particularly shown and described, it will be understood by those skilled in the art that various changes in form and details may be made therein without departing from the spirit and scope of the embodiments as defined by the appended claims.

The invention claimed is:

1. A method of processing an image, the method comprising:
  capturing, via a first camera of a vehicle, a first image;
  capturing, via a second camera of the vehicle, a second image;
  matching, via a processor, the first image with the second image such that the first image has an overlapping portion overlapping with the second image and a non-overlapping portion not overlapping with the second image, and the second image has an overlapping portion overlapping with the first image and a non-overlapping portion not overlapping with the first image; and
  changing, via the processor, a brightness of the overlapping portions of the first and second images,
  wherein the changing the brightness comprises:
  forming a first boundary at a center of the overlapping portions of the first and second images;
  forming a second boundary between the overlapping portion and the non-overlapping portion of the first image;
  forming a third boundary between the overlapping portion and the non-overlapping portion of the second image; and
  applying a gradation to a brightness of the overlapping portions between the first boundary and the second and third boundaries, and
  wherein applying the gradation includes increasing or decreasing the brightness of the overlapping portions toward the first boundary.

2. The method of claim 1, wherein applying the gradation includes increasing the brightness of the overlapping portions toward the first boundary, when a brightness of the first image is greater than a brightness of the second image.

3. The method of claim 1, wherein applying the gradation includes decreasing the brightness of the overlapping portions toward the first boundary, when a brightness of the second image is greater than a brightness of the first image.

4. The method of claim 1, wherein the brightness of the overlapping portions is increased away from the first boundary.

5. The method of claim 1, wherein the brightness of the overlapping portions is decreased away from the first boundary.

6. The method of claim 1, further comprising:
  setting a correction reference value for the first boundary based on a brightness of the first image and a brightness of the second image; and
  correcting the overlapping portions to have the brightness with the gradation from the first boundary using the set correction reference value.

7. The method of claim 1, further comprising:
  setting a correction reference value for the first boundary based on a brightness of the first image and a brightness of the second image; and
  correcting the overlapping portions to have the brightness with the gradation to a center of the first image and the second image from the first boundary using the set correction reference value.

8. The method of claim 6, wherein the correction reference value is at least one of an average, a median, a mode, and a standard deviation of brightness of the brightness of the first image and the brightness of the second image.

9. The method of claim 6, wherein the gradation has one of linear and non-linear relationships.

10. The method of claim 9, wherein, in the non-linear relationship, the gradation is applied in a radial direction of an edge from the center of the first image and the second image.

11. The method of claim 9, wherein, in the linear relationship, the gradation is applied in a straight direction of an edge of the non-overlapping portions from a center of the overlapping portions.

12. The method of claim 1, further comprising:
  transforming, via the processor, the first image and the second image into a top view form; and displaying, via a display of the vehicle, the transformed images with the applied gradation to the brightness of the overlapping portions as an around view monitoring (AVM) image.

13. The method of claim 1, further comprising:
capturing, via a third camera of a vehicle, a third image;
capturing, via a fourth camera of the vehicle, a fourth image;
matching, via the processor, the second image with the third image such that the second image has an overlapping portion overlapping with the third image and a non-overlapping portion not overlapping with the third image, and the third image has an overlapping portion overlapping with the second image and a non-overlapping portion not overlapping with the second image;
matching, via the processor, the third image with the fourth image such that the third image has an overlapping portion overlapping with the fourth image and a non-overlapping portion not overlapping with the fourth image, and the fourth image has an overlapping portion overlapping with the third image and a non-overlapping portion not overlapping with the third image;
matching, via the processor, the fourth image with the first image such that the fourth image has an overlapping portion overlapping with the first image and a non-overlapping portion not overlapping with the first image, and the first image has an overlapping portion overlapping with the fourth image and a non-overlapping portion not overlapping with the fourth image; and
changing, via the processor, a brightness of the overlapping portions of the second and third images, a brightness of the overlapping portions of the third and fourth images, and a brightness of the overlapping portions of the first and fourth images.

14. The method of claim 13, wherein the first image is a front view image of the vehicle, the second image is a left side view image of the vehicle, the third image is a rear view image of the vehicle, and the fourth image is a right side view image of the vehicle.

15. An image matching apparatus comprising:
a first camera of a vehicle configured to capture a first image;
a second camera of the vehicle configured to capture a second image;
a processor configured to:
match the first image captured by the first camera of the vehicle with the second image captured by the second camera of the vehicle such that the first image has an overlapping portion overlapping with the second image and a non-overlapping portion not overlapping with the second image, and the second image has an overlapping portion overlapping with the first image and a non-overlapping portion not overlapping with the first image, and change a brightness of the overlapping portions of the first and second images by forming a first boundary at a center of the overlapping portions of the first and second images;

forming a second boundary between the overlapping portion and the non-overlapping portion of the first image;

forming a third boundary between the overlapping portion and the non-overlapping portion of the second image; and applying a gradation to the brightness of the overlapping portions between the first boundary and the second and third boundaries, wherein applying the gradation includes increasing or decreasing the brightness of the overlapping portions toward the first boundary.

16. The image matching apparatus of claim 15, wherein the processor is further configured to:
set a correction reference value for the first boundary based on a brightness of the first image and a brightness of the second image; and
correct the overlapping portions to have the brightness with the gradation from the first boundary using the set correction reference value.

17. The image matching apparatus of claim 15, wherein the gradation includes linear gradation in which the gradation of the brightness is applied in a straight direction to the non-overlapping portions from a center of the overlapping portions or to the center of the overlapping portions from the second boundary and the third boundary.

18. The image matching apparatus of claim 15, wherein the gradation includes non-linear gradation in which the gradation of the brightness is applied in a radial direction to an edge of the first and second images from a center of the non-overlapping portions or to an edge from a center of the first and second images.

19. The image matching apparatus of claim 15, wherein the processor is further configured to:
convert the first and second images into a top view form.

* * * * *